United States Patent Office 2,939,302
Patented June 7, 1960

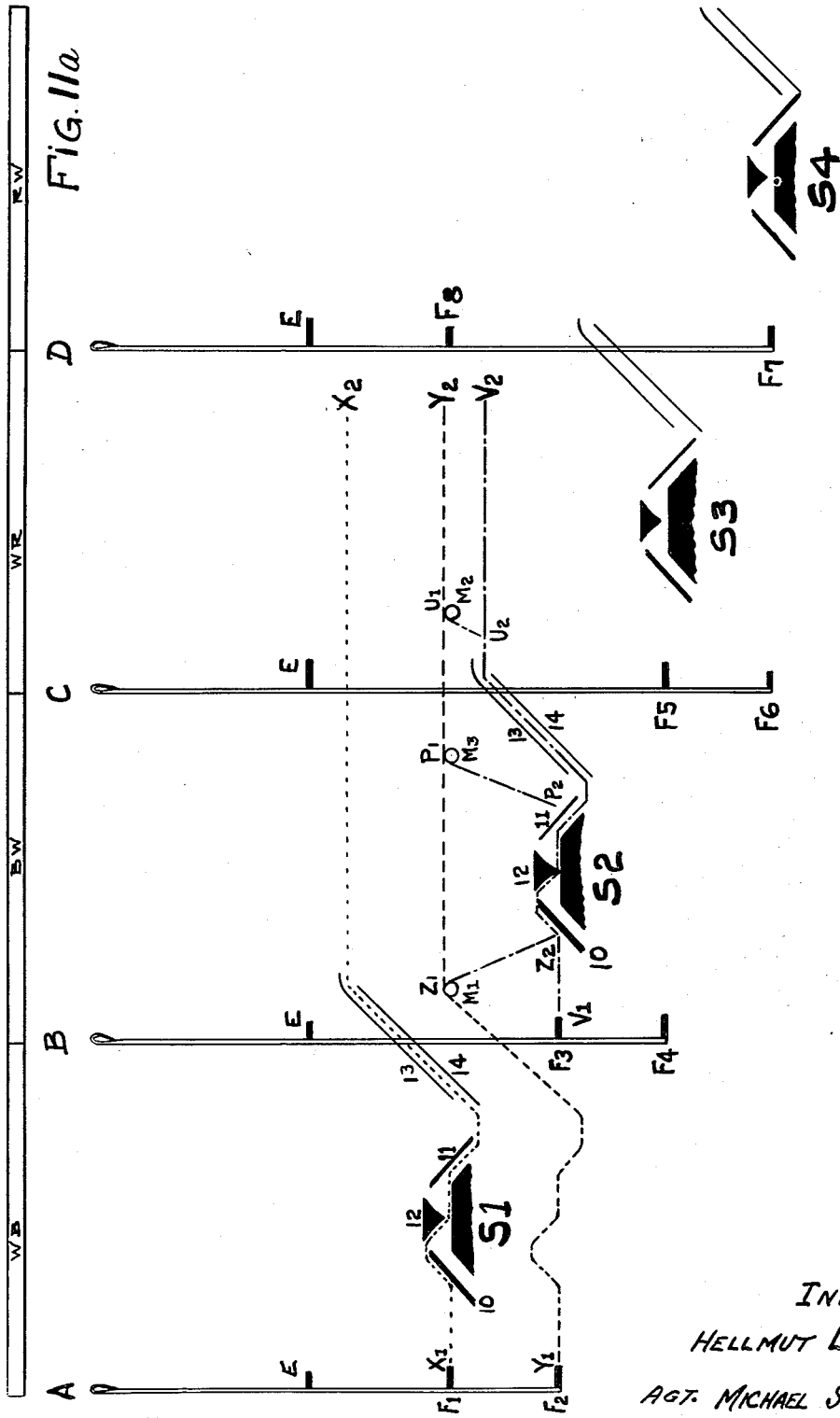

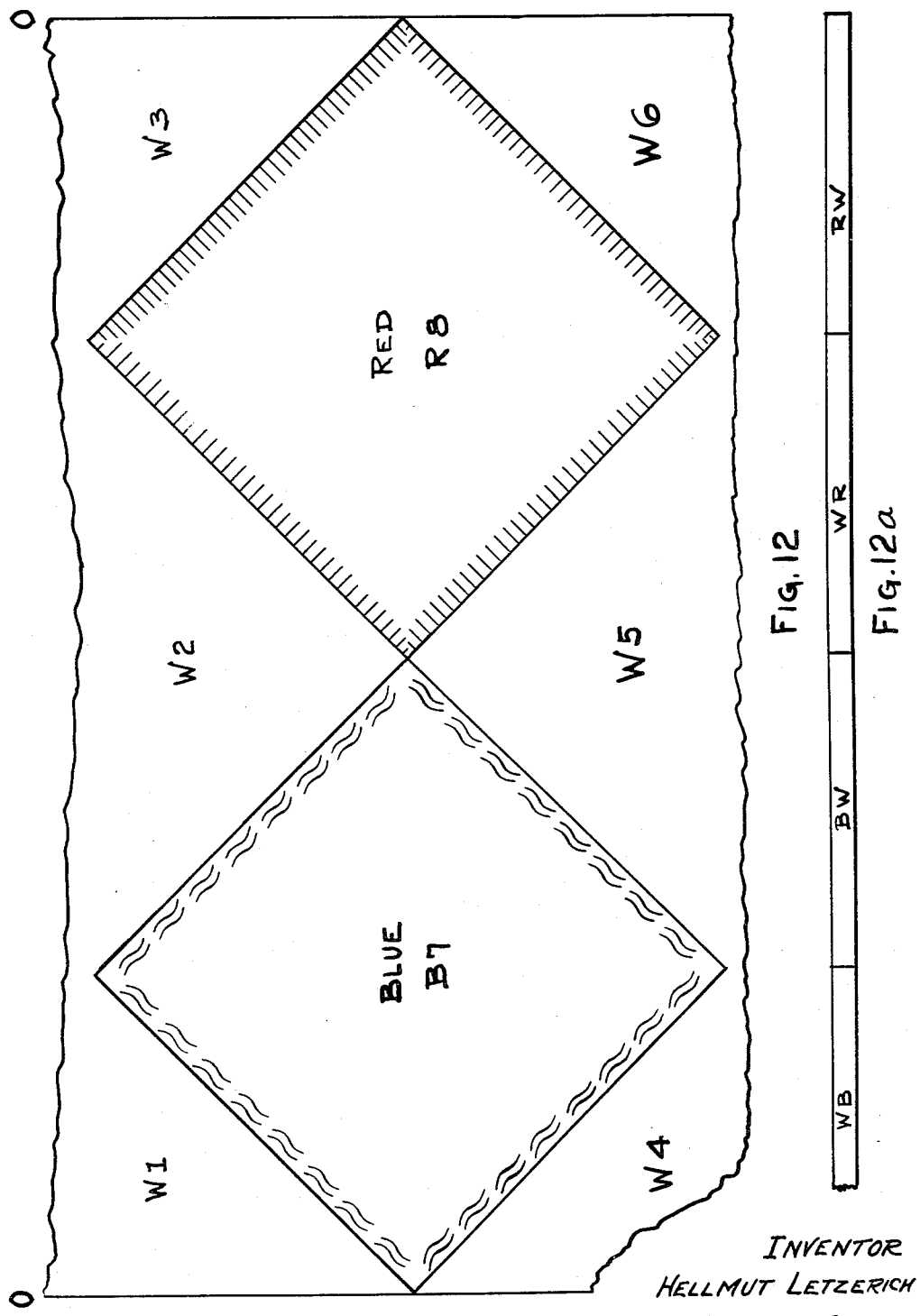

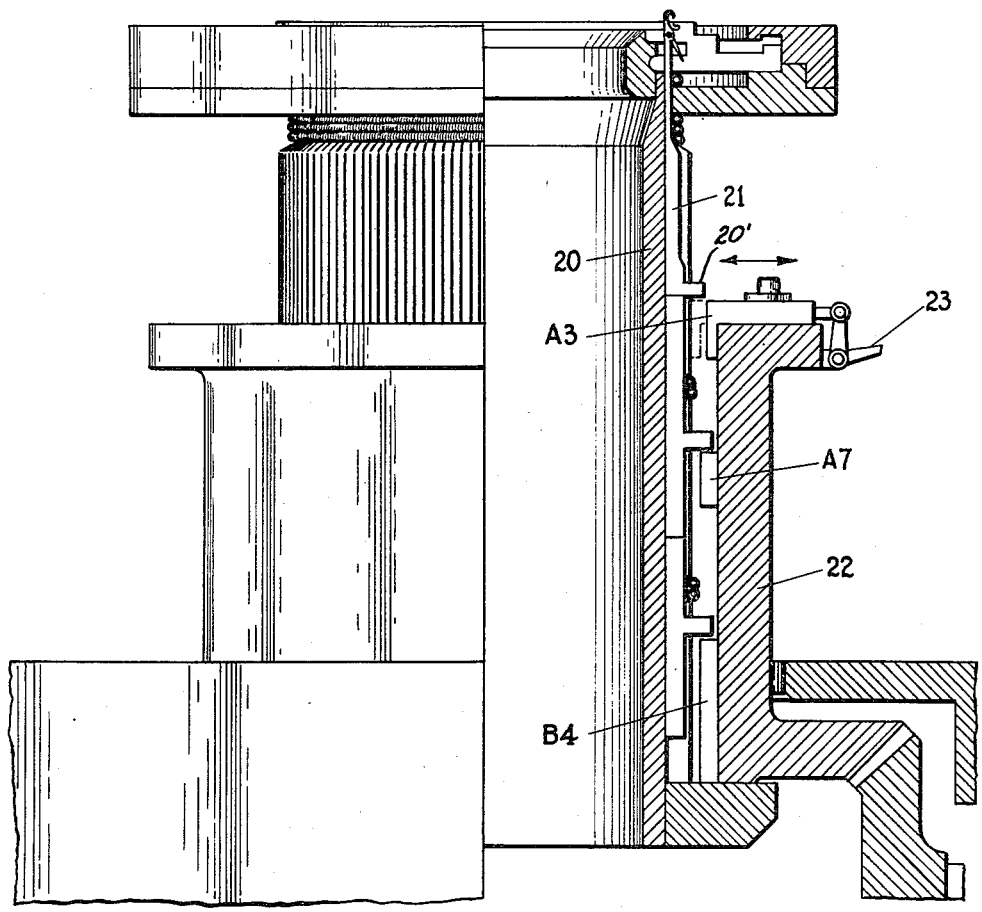

2,939,302

CIRCULAR KNITTING MACHINES

Hellmut Letzerich, Rheydt, Germany; Alexander Hoersen, administrator of said Letzerich, deceased, assignor to Hemphill Company, Pawtucket, R.I., a firm Filed July 30, 1953, Ser. No. 371,246

Claims priority, application Germany Aug. 1, 1952

18 Claims. (Cl. 66—43)

The present invention relates to circular knitting machines of the type used for knitting men's hose and the like, and more particularly the present invention relates to knitting machines which make a multicolored pattern, such as machines for manufacturing Argyle socks.

Known machines for making hose, such as Argyle socks, are quite complicated and have a relatively low output.

One of the objects of the present invention is to provide a knitting machine which operates according to a very simple principle for providing diamond-shaped patterns of different colors, as for example in the knitting of Argyle socks.

A further object of the present invention is to provide a circular knitting machine which has a far greater output than known knitting machines for accomplishing the same results.

Another object of the present invention is to provide a machine which is made up of relatively few, simply constructed parts, which are very reliable in operation.

With the above objects in view the present invention mainly consists of an apparatus for knitting multi-colored fabrics, this apparatus including a cam cylinder adapted to be reciprocated about its axis, and a plurality of knitting needle means arranged in side by side relation within a needle cylinder within the cam cylinder and being substantially parallel to the cylinder axis, so that said cam cylinder turns about the plurality of needle means, and each of the needle means includes at least one needle butt, the said plurality of needle means being made up of four successive groups of needle means each of which extends through 90° about the axis of the cylinder and each of which is different from the remaining groups of needle means. Four stitching cam means are mounted on the inner face of the cam cylinder and are respectively located 90° apart from each other to cooperate with the butts of the needle means for reciprocating the latter to knit a multicolored fabric.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 8a is a diagrammatic view showing the different types of needles used with the apparatus of Figs. 1–7, also the various jacks employed with those needles.

Figure 8b shows the cross hatching key employed for different groups of the knitting instrumentalities.

Figure 11 is a diagrammatic illustration of a different embodiment of a structure for knitting Argyle socks, or the like.

Figure 11a is a view diagrammatically illustrating the color scheme produced at the corresponding sections of the mechanism of Fig. 11.

Fig. 12 is a schematic view of a section of fabric showing an Argyle pattern.

Figure 12a is a similar view as applied against Fig. 12.

Figure 13 is a view, partly in section, showing the general arrangement of parts at the needle and cam cylinders.

Figure 14 is a view similar to Fig. 8a but illustrating a modification.

The present invention is described in connection with an apparatus for automatically manufacturing multicolored patterns with a cam apparatus where the knitting cam cylinder is adapted to reciprocate about the cylinder axis in such a way that a simultaneous knitting action takes place at four different knitting positions displaced from each other about the cylinder axis by 90°. During each forward and reverse movement of the cam cylinder and/or cams thereof, a complete row of loops are knitted about the entire circumference of the tube of fabric in four different colors.

Referring to Fig. 13 which shows the general arrangement of a machine of the type to which the invention is applied, a needle cylinder 20 is slotted in the usual way and carries needles 21 having butts 20', said needles being reciprocable in a conventional manner by engagement of their butts with a series of cams all of which are shown in the diagrammatic figures and with respect to which their function will be explained. These cams some of which are selectively movable are carried by a cam cylinder 22. Here the cam cylinder is rotated while the needle cylinder is stationary, but it is to be understood that this is a relative matter only and that, as is common practice, the opposite parts may be made rotatable.

Each needle has two jacks maintained in the slot beneath it and these have a butt arrangement as will be described more fully by reference to Fig. 8a. Needles are in part controlled through contact of their own butts with needle cams and in part by their jacks the butts of which are engaged by cams disposed in their pathway. Cams such as the cam A3 which is movable may be mounted on a slide and moved in or out radially by an actuator, an arm 23 engaged as it moves about the machine by some sort of pattern controlled striker. Such controls which make a flying contact with a cam setting member are old and need not be described to greater extent here.

Figure 8:
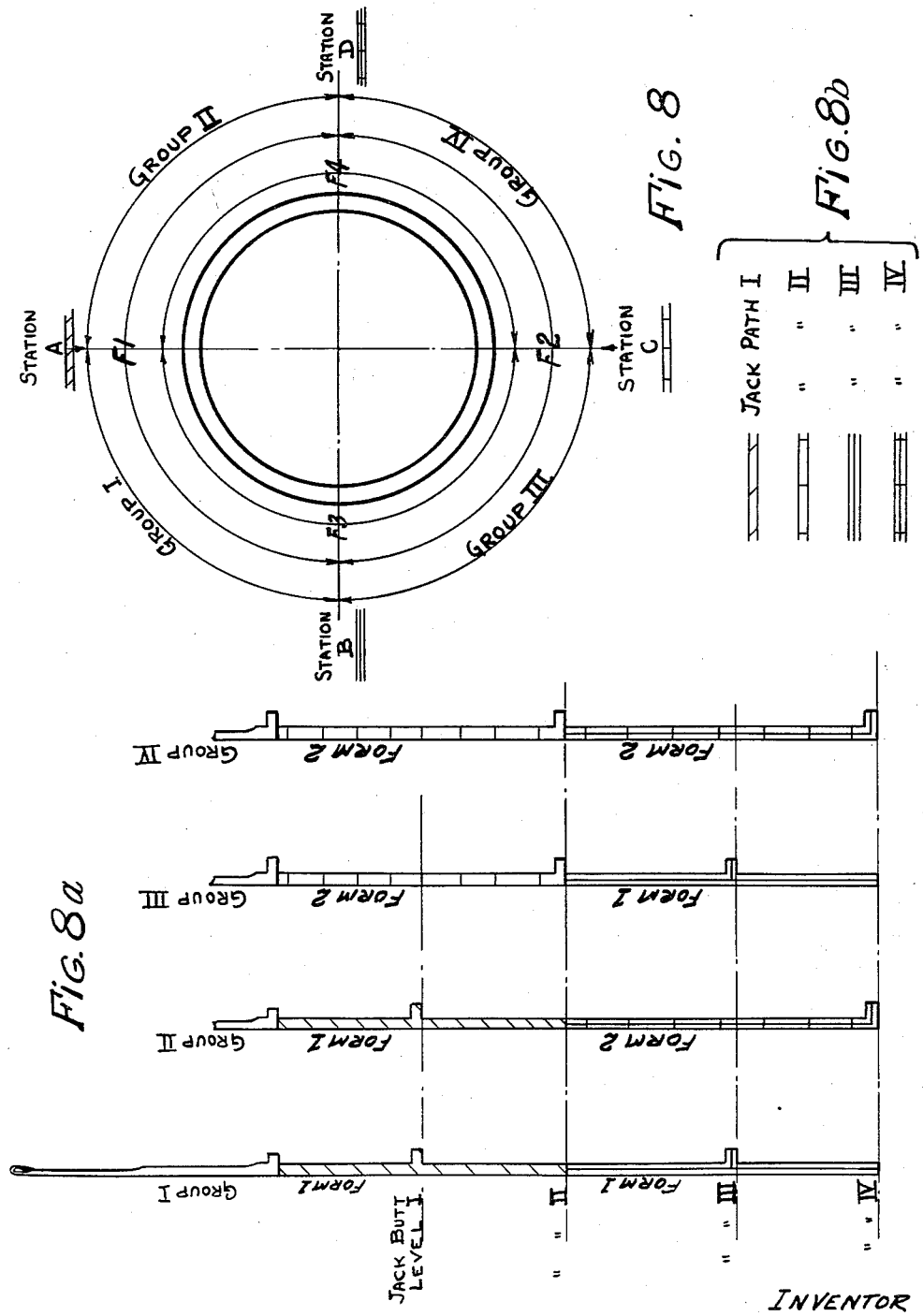
Figure 8 is a diagram showing the arrangement of needle groups about the axis of the cylinder.

In order to provide different knitting needles for the four different systems, a pair of jacks are associated with each needle in the manner shown in Figs. 8 and 8a. It will be seen that the four different groups of needles respectively have a combination of two different types of jacks each combination of which is different from the combination of jacks used with the other groups of needles. As may be seen from Fig. 8, the four sets of cams are indicated with the letters A, B, C, D and are located at 90° from each other about the axis of the cylinder. Also, the cam parts which act on the needle butts of all four systems are located at the same elevation. However, the cams which cooperate with the jack butts, which serve to differentiate the needles from each other, are located at four different elevations which may vary from one to the next by 40 mm.

In order to knit the top circular part of the hose, after transferring a rib top to the needles at the beginning of the operation, such conventional knitting taking place with the cams A, as well as to provide for knitting of a conventional heel and toe, which also takes place with the cams A, individual cams are movable to and from an operating position, but the main cams which produce the knitting at all four systems are fixedly mounted.

Figure 10:
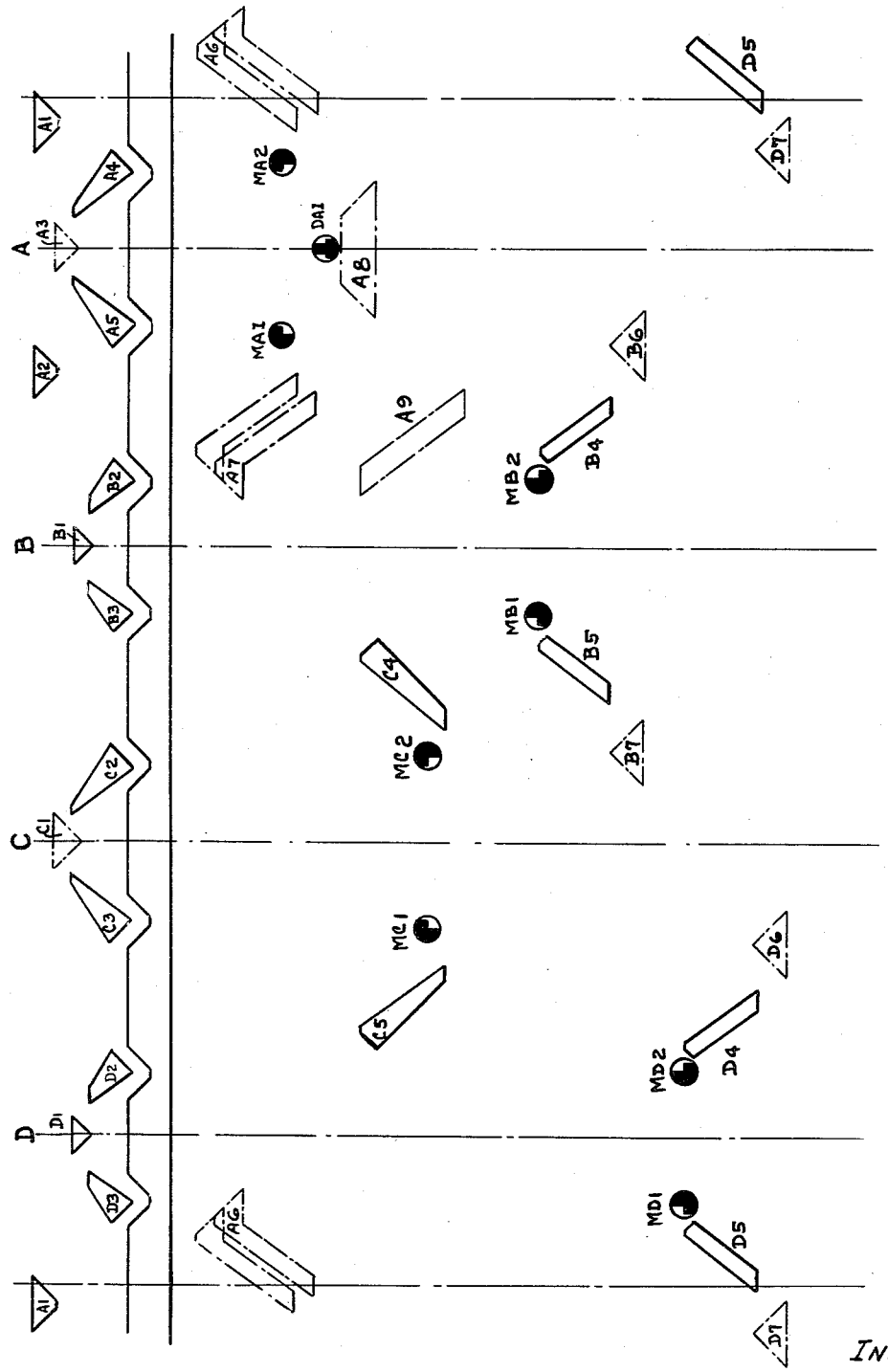
Figure 10 is a developed view of the interior of the cam cylinder showing all of the cams and control fingers associated therewith.

Referring now to Fig. 10 which shows the cam cylinder in developed view with a duplication of certain cams at the A group, it will be seen that the cams A3, C1, A8, A9, B6, B7, D6, D7 are movable into and out of an operating position and are indicated in dot-dash lines. The same is true of the cams A6, A7 which are vertically movable, and the control fingers or picks MA1, MA2, MB1, MB2, MC1, MC2, MD1, MD2 as well as the double control finger or pick DA1 are also retractable from and movable into an operating position where they extend inwardly from the inner face of the cam cylinder.

The remaining 18 cams are normally fixed and remain in one position, and the only requirement is that they must be adjustably mounted to be properly positioned for making desired loops. The control of the cams can take place in a known way from a main control drum, and the movement of the control fingers to and from their operating positions may be brought about by a control chain.

The double control finger DA1 and the control fingers MA1 and MA2 must also be controlled by the main drum. Tight and loose knitting is brought about by the raising and lowering of the cylinder. In all events, the construction of the cam carrying structure and the actuation thereof can be arranged in such a way that the entire cam system can be raised and lowered, and in this way the necessity for a support in the exact form of a cylinder is eliminated.

The yarn guiding rings are so constructed that they are not turnable about a single axis which provides a simple raising and lowering of the yarn guide; instead the motion of the yarn guide must be so arranged that in order to withdraw the yarn guide it must first be raised while in a horizontal position, and only after it is raised beyond the region of the needles can it be moved to the withdrawn position. The lowering of the yarn guide takes place in the identical but reversed manner. Five yarn guides are provided for the system A, and of these one yarn guide is for the looping stitches, the second and fourth yarn guides are for the knitted pattern, the third yarn guide is for the heel and toe of the sock, and the fifth yarn guide is for the annular top part of the sock.

The cam systems B, C, and D each have two yarn guides for changing colors, and the exchange of yarn guides is effected by the main control drum. Of course, it is possible to increase the number of yarn guides in order, for example, to place transverse stripe designs within the diamond-shaped designs. In this case a type of ring-shaped device is used which enables the control of the yarn movement to be brought about by the pattern chains. The machine reciprocates back and forth through an arc of 360°.

The individual control steps which take place within the cam cylinder so that the independent knitting of the four different systems may take place will now be described.

Assuming that the set of cams A, which are the main cams, are located at a given normal position, the cams B are located 90° about the cylinder axis from the cams A, the cams C are located opposite the cams A, and the cams D are located opposite the cams B.

The needles are mounted in the needle cylinder in the usual manner, that is the short butt needles at the heel side and the long butt needles are at the opposite side, displaced by 180°.

The jacks are associated with the needles in the manner shown in Fig. 8a. There are only two different types of jacks which are designated Form 1 and Form 2, as shown in that figure. Form 1 jacks are located directly beneath the short butt needles which extend for 180° about the cylinder axis so that these needles are governed by the butts at level 1 which are the highest jack butts. The Form 2 jacks are located next to the bottom ends of the long butt needles so that at the half of the needle cylinder where these needles are located, the highest jack butts are lower than the jack butts of the short butt needles, as is evident from Fig. 8a. The lowermost jacks are installed in such a way that the Form 1 jacks are distributed through 180°, half of these latter jacks being associated with the long butt needles and half with the short butt needles and being located in the region of cam system B, as is shown in Fig. 8. Thus, at this part of the needle cylinder the lowermost jacks have butts located above the bottom ends of these lowermost jacks. At the opposite side of that cylinder from the lowermost jacks of Form 1, the lowermost jacks of Form 2 are located so that at this side of the cylinder the jacks have the lowest butts. This arrangement is indicated diagrammatically at the upper right hand side of Fig. 8, and at Fig. 8b a code for indicating the paths of the jack butts located at the four different elevations is indicated, this code being repeated in Figs. 1–7 to show the paths of the several jack butts during the various operations of the apparatus.

Figure 9:
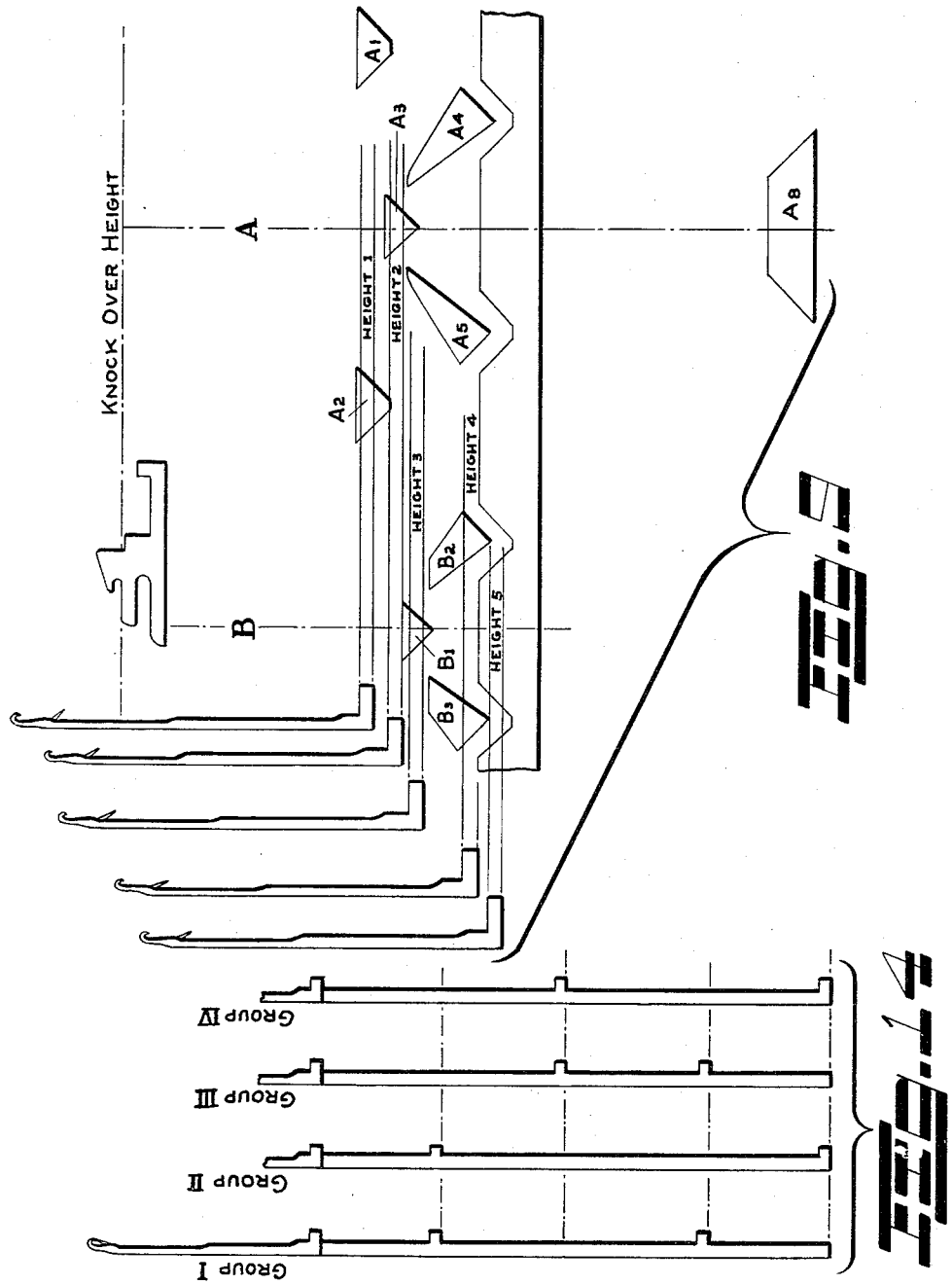
Figure 9 is a diagrammatic illustration of the various heights to which the knitting needles of the invention are moved, these heights being shown in relation to two sets of stitching cams and in relation to the sinker.

As is shown in Fig. 9, in order to separate the different needle paths, all of the knitting functions take place at five different elevations which are shown in Fig. 9 with respect to the sinker and the knockover elevation. Elevation 5 is the lowest of the elevations where the knitting of a relatively loose loop (4 mm. beneath the knockover elevation) takes place. Elevation 3 is the lowest elevation at which casting off of the loops takes place, and this action is brought about by the cam systems B and D. Elevation 2 is the casting off position brought about with the cams A and C. The elevation 4 is the circulating elevation for needles which are moved out of engagement in a downward direction, and the elevation 1 is the circulating elevation for needles which are moved upwardly out of engagement, this elevation 1 being the highest needle elevation.

When knitting simultaneously with the four systems, the needles knitting with cams A are guided over systems B, C, D; the needles knitting by cooperation with cams B are guided under the cams C, D, and A; the needles knitting at cams C are guided over cams D, A, and B; and the needles knitting at cams D are guided under the cams A, B, and C.

Figure 1:
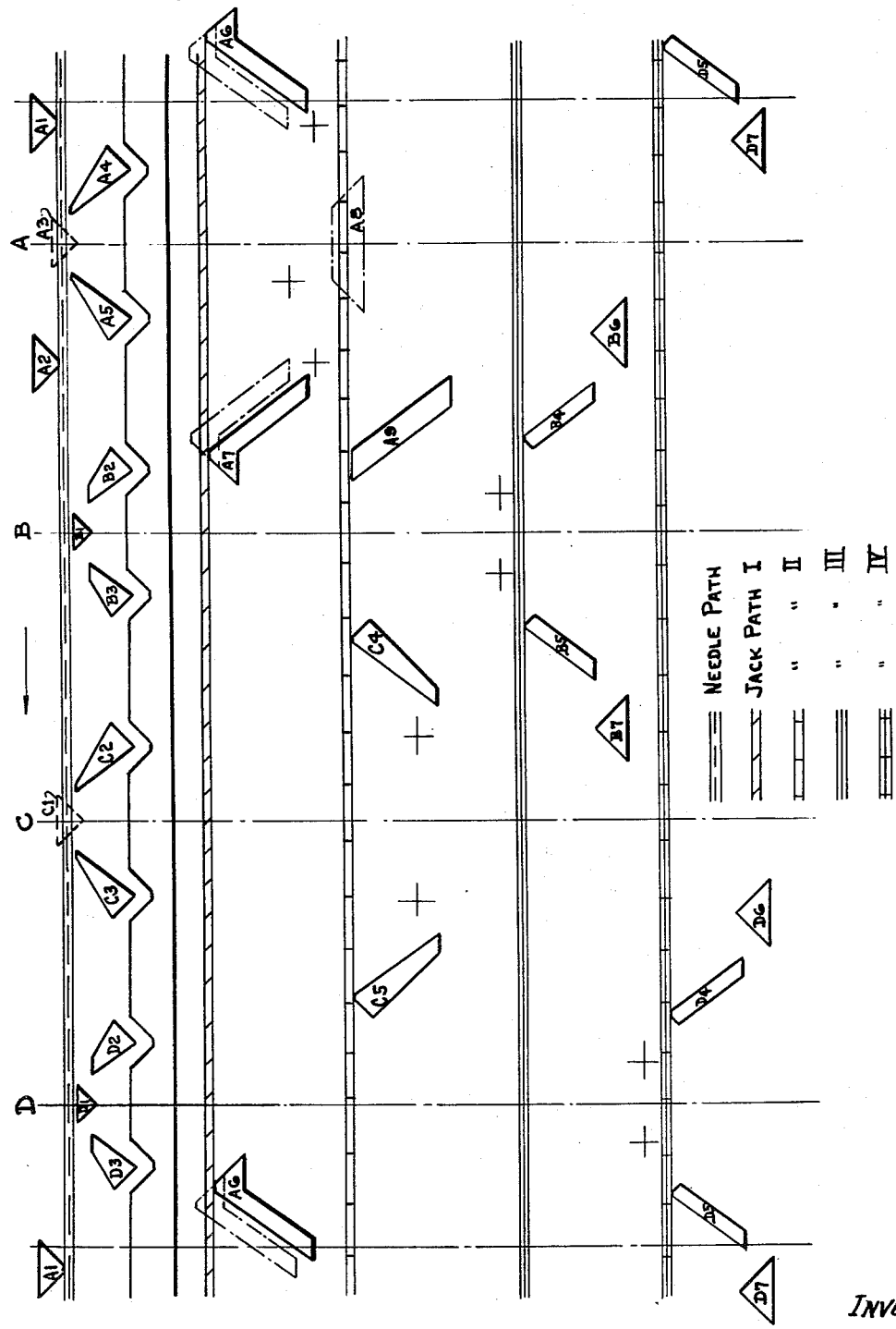
Figure 1 is a diagrammatic view of the cam path of a knitting machine embodying the present invention, and showing the operating relationship of the cams and associated mechanism when all of the needles are raised above the cam blocks, e.g. to accomplish hand transfer of a rib top.
Figure 2:
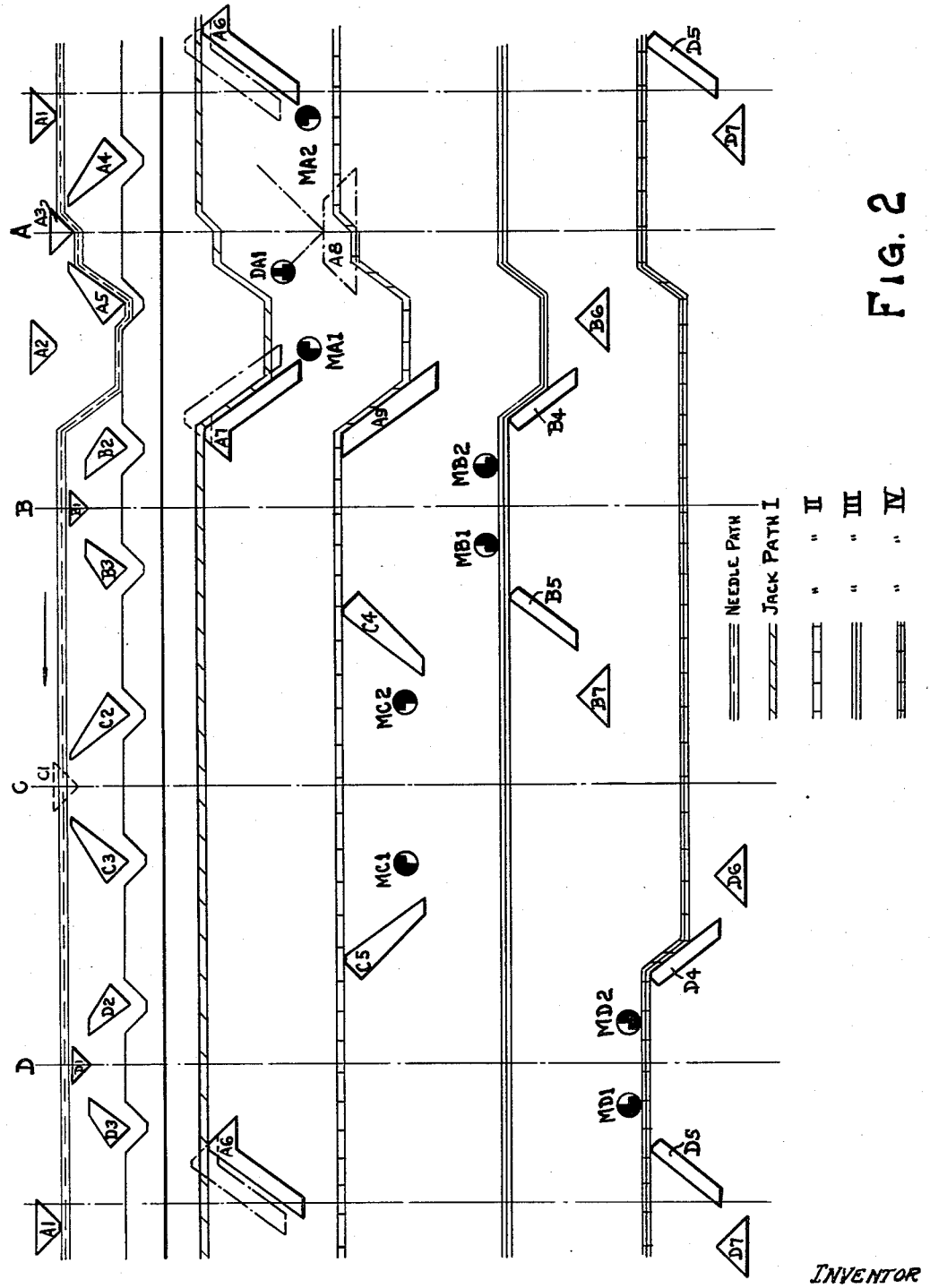
Figure 2 is a similar view for rotary knitting with cam system A.

In the manufacture of one complete sock, the top circular part of the sock is knitted first. Referring to Fig. 1, it will be seen that, if it is desired to transfer a rib top to the needles, the cams C1, A3, and A8 are retracted from their operating position, and cams A9, B6 and B7, D6 and D7, are moved into their operating position while the cams A7 and A6 are moved to their lower operating position. Therefore, after one revolution of the cam cylinder all the needles are located at the same height, that is the elevation 2 shown in Fig. 9, and are ready for the transfer of a ribbed top in the conventional manner.

Before the multicolored pattern is knitted, several rows of a single color are knitted to form the annular top part of the sock. The apparatus is located in the position shown in Fig. 2 for this purpose, and from Fig. 2 it will be seen, as contrasted with Fig. 1, that only the cam A3 has been moved into its operating position (half way on the short butt needles and all the way in on the long butt needles) and in this way the needles are guided downwardly along the cam A5 so as to make the necessary knitting motions. All jacks are pressed downwardly by the engagement of the needle butts with the cam A5. The highest jack butts are raised by the cam A7, the next lowest jack butts are raised by the cam A9, the next lowest jack butts are raised by the cam B4, and the lowermost jack butts are raised by the cams D4. The cams A7 and A9 raise all of the needles simultaneously above the cams B1 and D1, and it will be noted that the cam C1 is retracted so that the knitting takes place by the cams A alone.

Figure 3:
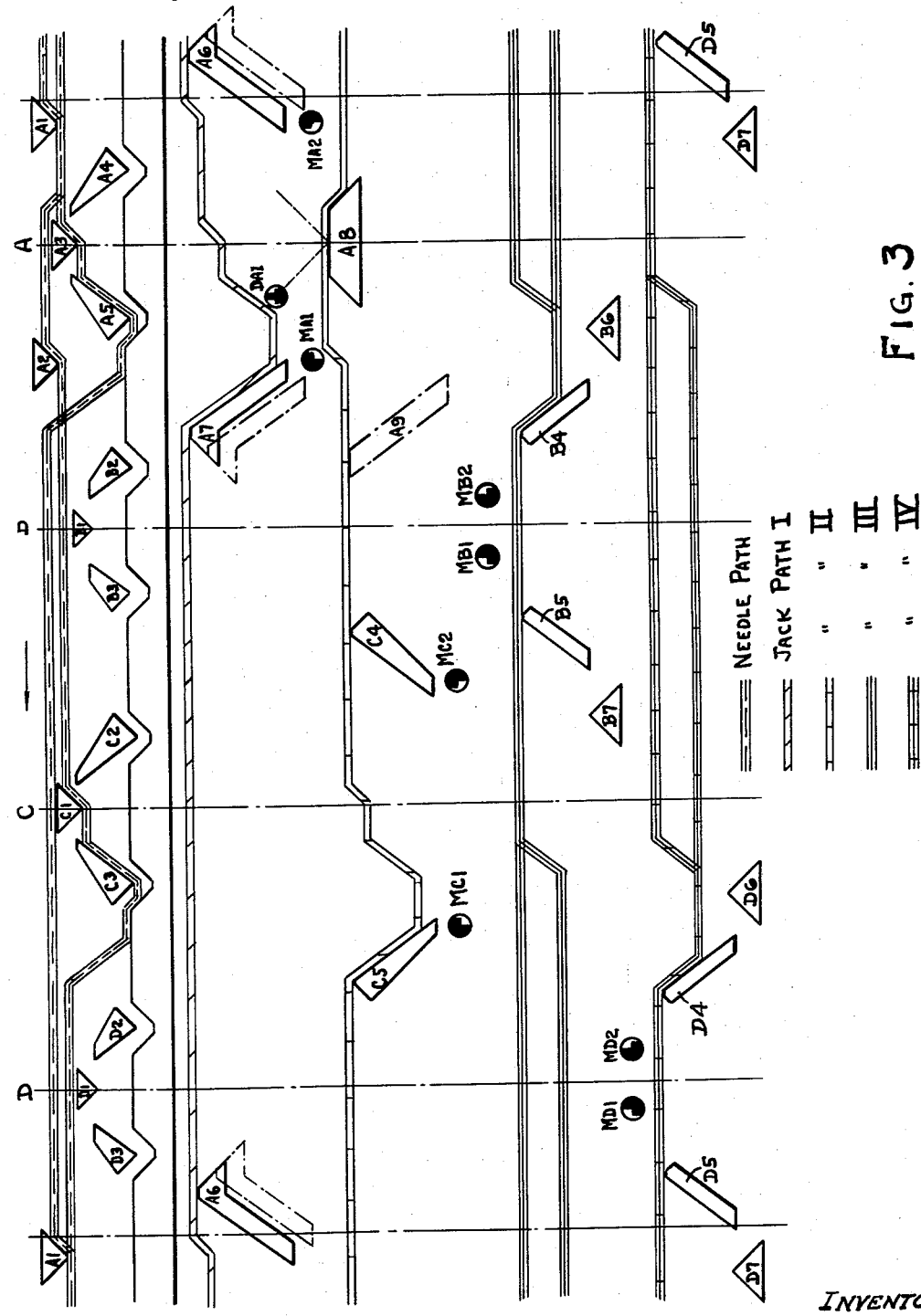
Figure 3 is a similar view for knitting in the direction indicated with cam systems A and C.
Figure 4:
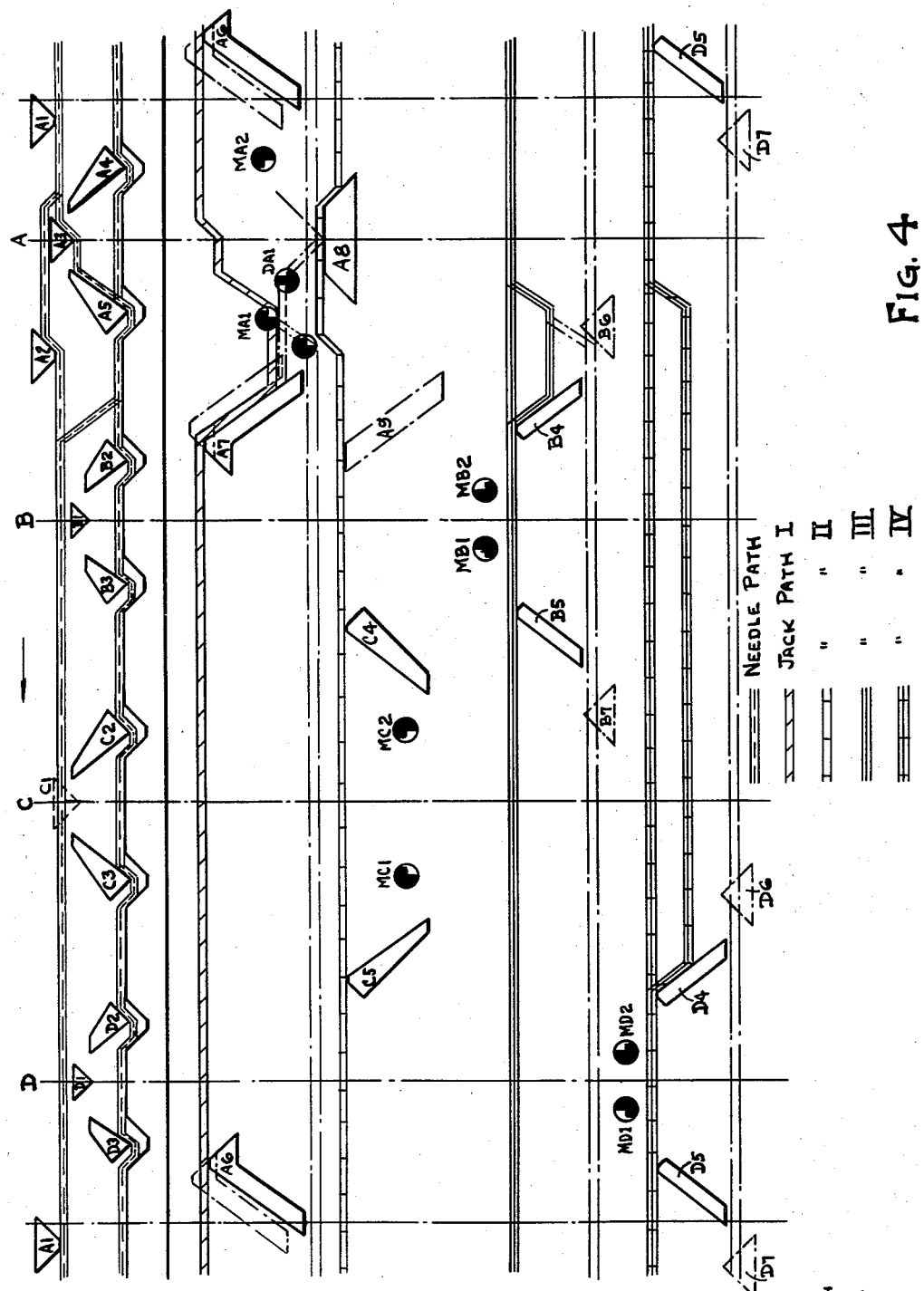
Figure 4 is a similar view of the cams and associated mechanism during heel and toe knitting, and showing the action of narrowing fingers MA1.
Figure 5:
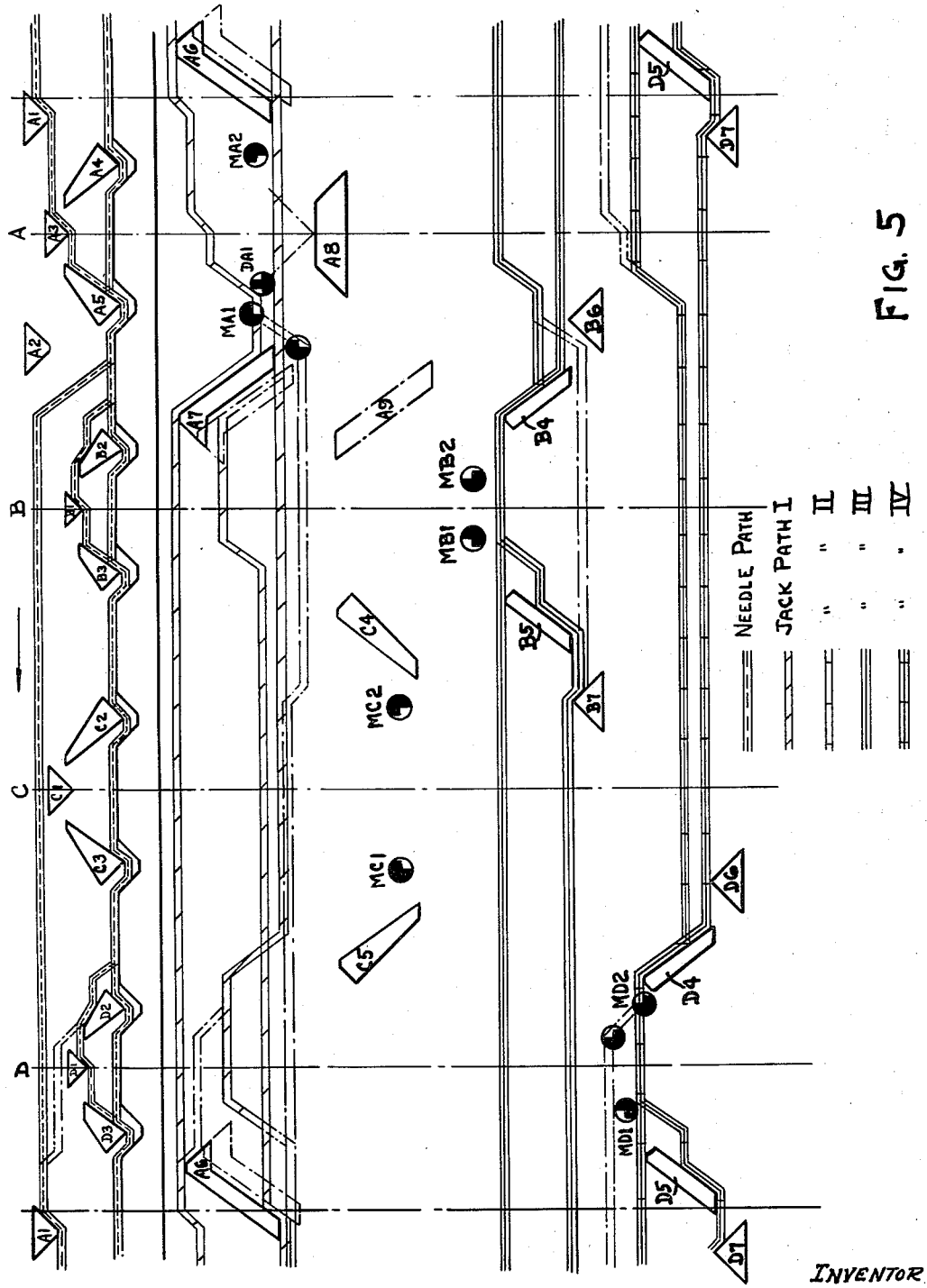
Figure 5 is a similar view showing the action of narrowing fingers MA1 and MD2.
Figure 6:
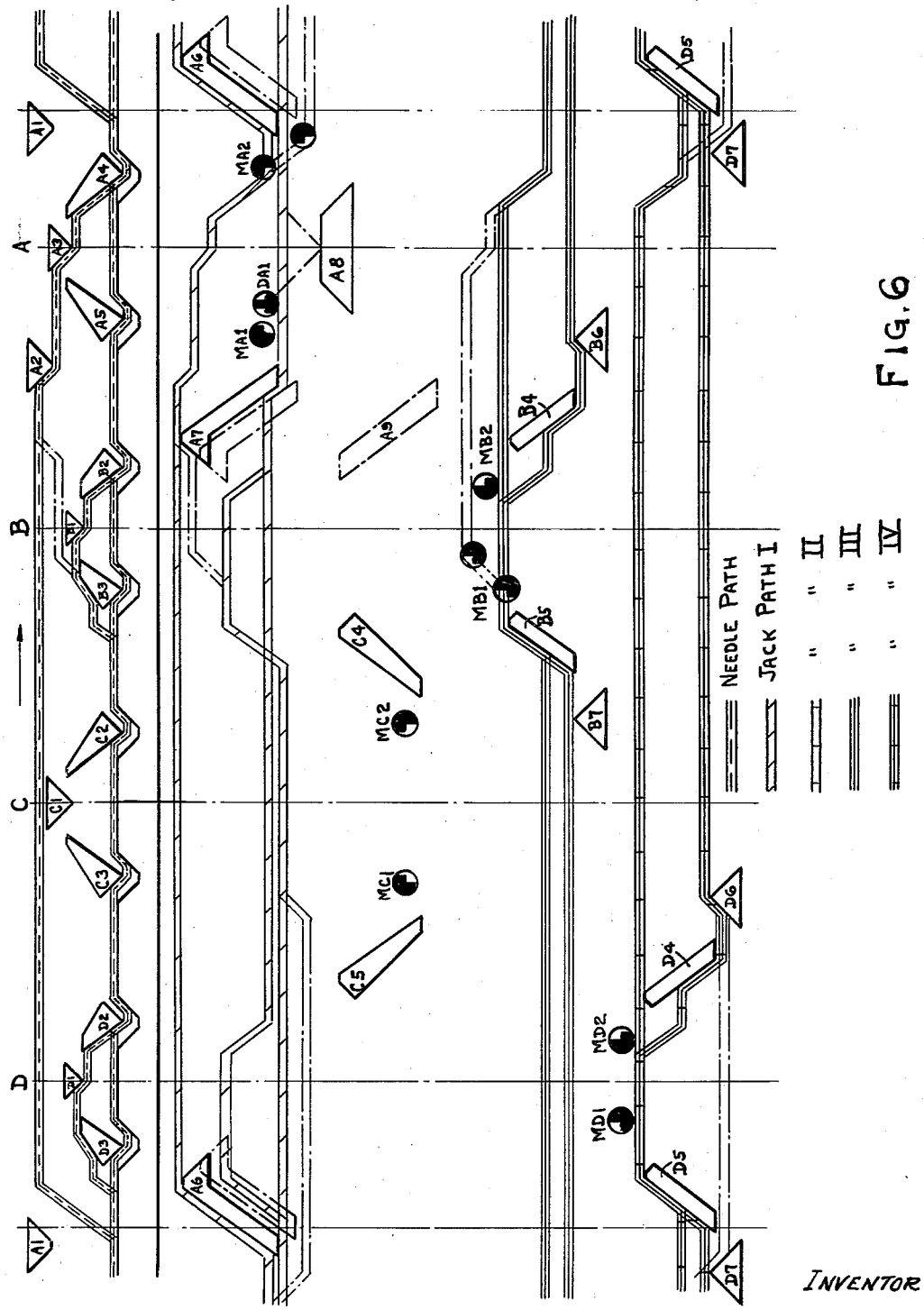
Figure 6 is a similar view showing the action of narrowing fingers MA2 and MB1.
Figure 7:
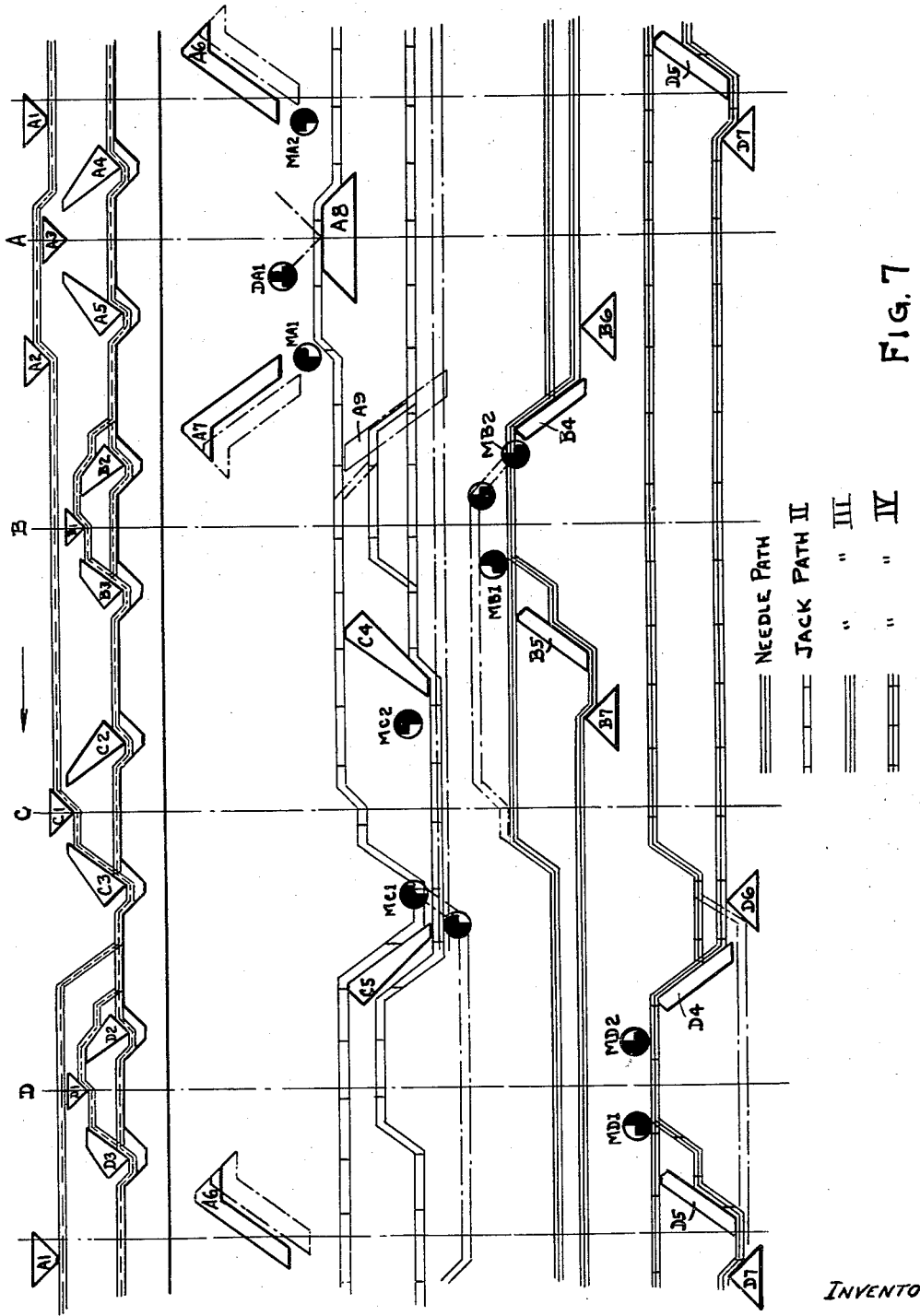
Figure 7 is a similar view showing the action of narrowing fingers MB2 and MC1.

Assuming that it is now desired to start the knitting of the diamond-shaped pattern, the cams are located in the position shown in Fig. 3 of the drawings. Thus, the cams C1 and A8 are moved into their operating position, and the cam A9 is retracted from its operating position. The cams A6 and A7 are moved to their higher position. In this way the short butt needles, which are influenced by the highest jack butts, are controlled in the following manner. The cam A1 moves the needles downwardly so as to also bring the jacks down, to the height where the needle butts engage the cam A3 to be moved downwardly to the cam A5 so as to move down to the stitch drawing point. As is evident from the drawings, the several cams cooperate with a circular ring-shaped guide having notches in its top edge, and the notch below cam A5 raises the needles to the elevation 4 (Fig. 9) so that the cam part A7 cooperates with the highest jack butts to raise the needles thereover to a height great enough so that the short butt needles pass over the remaining three cam systems. During the reverse movement of the cam cylinder the entire operation is repeated in exactly the same way because the cams are symmetrically arranged, as is evident from the drawings.

Thus, one half of the circumference is knitted in this way. The other half of the circumference of the sock is knitted with the cams C, this knitting taking place with the long butt needles and with the jacks which have their butts located at the second highest position of the jack butts. In other words, as may be seen from Fig. 8, the long butt needles, indicated as being types 3 and 4, have upper jacks of Form 2 whose butts are located lower than the butts of the upper jacks of Form 1, and these upper Form 2 jacks have butts which cooperate with the cam system C. The knitting with the cams C is brought about by moving the needles downwardly with the cam C1 into engagement with the cam C3 which moves the needles downwardly to the sinking point located at elevation 5 (Fig. 9), the circular guide ring now raised the needles to the elevation 4 so that the cam C5 cooperates with the second highest jack butts to raise their associated needles to the elevation 2 (Fig. 9). In this way this second group of needles is raised to a high enough elevation to pass over the cams D and B and when they arrive at the cams A, the second highest jack butts engage the cam A8 so that the second group of needles is raised over the cam A3 to the elevation 1 shown in Fig. 9 so that this second group of needles knits only with cams C and not with cams A. In order to enable the second group of needles to move into the cam system C by engaging the cam C1, the cam A2 engages the needle butts of this second group to move them to the elevation 2.

Because of the symmetrical arrangement of the cams, exactly the same process takes place during reverse turning of the cylinder. The lowermost jacks cooperate with the cams B4 and D4 during turning movement of the cam cylinder in one direction and with the cams B5 and D5 during turning movement of the cam cylinder in the opposite direction so that they have no effect on the operation.

All of the control fingers including the double finger DA1 are retracted from their operative positions when this knitting action is started.

Assuming now that it is desired to narrow the color areas so that they approach a point to produce the desired diamond-shaped pattern, then the control fingers or picks MA1 and MC1 must be moved into their operating position to be located therein at the first forward motion of the cylinder. See Figs. 4 and 7. In this way during this forward turning movement of the cam cylinder the first of the group of jacks having the highest jack butts and the first of the group of jacks having the next to the highest jack butts are directed, after the knitting action produced by cams A5 and C3, respectively, out of the region of the cams A7 and C5 so that the needles associated with these particular jacks and having a knitted loop thereon are not raised so that the loops are held on these needles. This is brought about by the control finger MA1 which directs only the first of the jacks for that group of needles having jacks with the highest jack butts downwardly below the cam A7 and by the control finger MC1 which directs only the first of the jacks having the next to the highest jack butts downwardly below the cam C5. Thus, during the reverse turning of the cam cylinder, this first needle, associated with the first jack having the highest jack butt and which originally passed through the cams A, is now at an elevation which directs it through the cams B, and in the same way the first needle which passed through the cams C now passes through the cams D.

During this same reversed turning movement of the cam cylinder the first of the series of jacks having the highest jack butts is engaged by the control finger MA2 so as to be directed beneath the cam A6, and the first of the series of jacks having the next to the highest jack butts is engaged by the control finger MC2 to be moved under the cam C4 so that the needles associated with these two particular jacks are not raised and move beneath the cams D3 and B3. These particular jacks are no longer raised by the cams A6 and C4 so that the needles associated with these jacks and their loops remain in the lower position and when the direction of turning of the cam cylinder is reversed the knitting with these particular needles takes place with cams D and cams B. Thus, during each reversal of the movement of the cam cylinder the first of the series of needles which cooperate with the cams A and C are directed away from these cams to cooperate with the cams B and D, and this process is continued until no more needles knit with the cams A and C and all of the needles knit with the cams B and D, which is the exact reverse of the start of the operations described above where all of the knitting took place with the cams A and C. Then the process is again reversed so that during one turning movement of a cam cylinder the first of a series of jacks having the lowermost butts is engaged by the finger MD2 to be raised. In this way the jack above this particular jack is also raised and the needle also is raised over the region of the cam D1. During further continuation of this turning movement, the highest jack butt is engaged by the cam A6 and guided into a position where the jacks having the highest butts now have the needles associated therewith cooperating with the cams A. During the same movement of the cam cylinder, the first of the series of jacks having next to the lowest jack butts is engaged by the control finger MB2 and is raised upwardly thereby, and the jack located thereover and having a butt at the next to highest elevation of the jack butts as well as the needle thereover are moved upwardly so that the needle is raised out of the region of the cam B1 and during the further movement cooperates with the cam C1 so that the knitting now takes place with the cams C. See Fig. 7. During the reverse or clockwise turning movement the same operation is repeated with the first of the series of bottom jacks so that the bottom jacks having the lowermost butts move their needles away from cams D and into cams C while the bottom jacks having the next to the lowest jack butts move their needles away from cams B and into cams A.

Similarly, at counterclockwise strokes, group II needles controlled by jacks with bottom butts are returned to knit at cams A from knitting at station D, while those in group III are returned to knit at cams C after having knitted at station B; those are the jacks with next to lowermost butts.

When this latter process has been repeated sufficiently so that all of the jacks with the uppermost butts have their needles again knitting with cams A and so that all of the jacks with the next to the highest jack butts have their needles knitting with cam C, the entire pattern has been completed on both sides of the sock.

The length of the sock may advantageously be so measured that at this point the knitting of the heel begins. In order to knit the heel it is necessary (Fig. 4) that the jacks with the next to the highest jack butts, which cooperate with the long butt needles, be placed out of operation during the entire period of the knitting of the heel. In order to bring this about the cam C1 is retracted from its operating position and at the same time the cams B6, B7, D6, D7 are also retracted from their operating position. Also, the cams A6 and A7 are pressed down to their lower position. Now the knitting of the heel can take place with reciprocation of the cam cylinder and only the short butt needles with the jacks having the highest jack butts produce the knitting action. Narrowing is produced with the same control fingers (MA1 and MA2) which produce the desired pattern. Only during widening does the double finger DA1 come into action, and this finger DA1 must be moved into its operating position for this purpose. When the knitting of the heel has been completed, the machine operates in the manner described above in connection with Fig. 2 so that conventional annular knitting takes place, and this can continue up to the beginning of knitting of the toe of the sock, all of the knitting taking place with the cams A, as was described above in connection with Fig. 2. At this time, with the same arrangement of cams which is used in the knitting of the heel, the knitting of the toe takes place, and when the knitting of the toe is ended the machine is again placed back in the position of Fig. 2 and the knitting of the finishing stitches takes place. When this part of the process is ended all of the yarn guides are moved to their inoperative position. The completed sock is removed, and the cam A3 is retracted from its operative position and all of the needles are then located at the elevation 2, as was described above in connection with Fig. 1, and then the machine may be stopped and prepared for knitting the next sock which is knitted in exactly the same way as was described above.

Many variations in the knitted pattern are possible, such as the knitting of inclined strips or squares or triangles or hexagons, or any combinations of these or other patterns, since it is only necessary to move desired control fingers into and out of the operating position, which can easily be accomplished by a pattern chain or pattern drum. Also it is possible to produce one or more ring-shaped patterns or to produce further patterns by plating of any type.

The above described example of the invention can be changed, for example, by making both jacks of each needle in one piece, or instead of jacks to use only correspondingly elongated needles having different butts but having the same construction as that shown in Fig. 8a, or generally similar to what is illustrated at Fig. 11.

As shown in Fig. 14, the jacks made up of two halves per complete jack for a single needle according to Fig. 8a, are single part elements. This involves four different jack forms while that form of the invention of Fig. 8a requires only two jack forms from which, by proper choice in assembling, one may obtain four different combinations.

Finally, a reciprocating machine for the same purpose and of the same construction can be made with a stationary cylinder and with reciprocating cams which turn with respect to the cylinder and the needles. Instead of transferring needles from one cam system and color to the next cam system and color through the medium of control fingers, the needles can also be moved from one working group to another group by different cams located over each other and moved into and out of operation corresponding to the desired pattern to cooperate with corresponding jack butts.

If it is desired to avoid reciprocation of the machine parts, whether it be reciprocation of the needle cylinder or cams, then the same arrangement can be applied with a stationary needle cylinder and two cam systems rotating in opposite directions and being out of phase with each other by 180°, each system having all of the cams shown in Figs. 1–10. The needles or their jacks must then have twice the needle and jack butts shown in the drawings so that with this arrangement one group of butts cooperates with the cams rotating in one direction and the other group of butts cooperates with the cams rotating in the opposite direction and being 180° out of phase with the first-mentioned cams.

According to the embodiment of the invention shown in Fig. 11, four sets of stitching cams are provided, but these cams are spaced from each other by 90° about the cylinder axis and are located at different elevations. With the structure of Fig. 11 the knitting action also takes place by reciprocation of the cam cylinder and the stitching cams therewith. As may be seen from Fig. 12, a part of an argyle sock is shown in developed view extending from line O to line O. The areas $w-1$, $w-2$, $w-3$, $w-4$, $w-5$, $w-6$ are, for example, knitted from one or more white yarns, the area $b-7$ is knitted from one or more blue yarns and the area $r-8$ is knitted from one or more red yarns. In none of the above areas is there more than one color.

To knit a sock with this pattern, four different types of needles are required and these types A, B, C, D are shown in Fig. 11. All of these needles knit at the same elevation. The butts E do not serve for knitting but are only used for narrowing at the heel and toe of the sock and for this purpose the needles A and B have short butts E and the needles C and D have long butts E.

Besides the butts E, the needles A—D each have a pair of knitting butts which are located at different elevations. The needles A are each provided with a pair of knitting butts F1 and F2, the needles B are each provided with knitting butts F3 and F4, the needles C are each provided with a pair of knitting butts F5 and F6, and the needles D are each provided with a pair of knitting butts F7 and F8. As may be seen from Fig. 11, the butts F1 and F8 are located at the same elevation while the butt F2 is located at the same elevation as the butt F3, the butt F4 is located at the same elevation as the butt F5, and the butt F6 is located at the same elevation as the butt F7. One quarter of the circumference of the needle cylinder is provided with needles A, a second quarter with needles B, a third quarter with needles C, and the last quarter with needles D, these groups of needles being arranged in succession in this order. Also, in the first quarter of the cam cylinder the set of stitching cams S1 is located, while the sets of stitching cams S2, S3 and S4 are respectively located in the successive quarters of the cam cylinder, these sets of cams being located at different elevations.

The operation of the structure of Fig. 11 will be described in connection with the groups of needles A and B, but it is to be understood that the same operation takes place with the groups of needles C and D. Each needle A passes with its butt F1 through the set of stitching cams S1 to be raised by cam 10 thereof, to engage cam 12 so as to move down to cam 11, to be depressed by the latter to the stitch drawing point and to be raised upwardly by cam 14 so that the butt F1 moves along the path X1—X2. The lower butt of needle A, namely butt F2, at the same time moves along the path Y1—Y2 and does not contact any cams. However, the very first needle A, of the group of needles A, has the butt F2 thereof engaged by the control finger or pick M1 so that this very first needle of the group of needles A is moved downwardly along the path Z1—Z2 and the butt F2 of this first needle now passes through the set of cams S2 to move along the path V1—V2 and knits with a different color than the remainder of the needles A which do not move downwardly along the path Z1—Z2 and whose butts F1 move along the path X1—X2. In this way the area of a particular color is narrowed to produce eventually the diamond shape of the pattern.

The needle B at the same time moves with its butt F3 along the path V1—V2, this butt F3 being engaged by the cam 10 of the set of stitching cams S2, moving downwardly upon engagement with cam 12 and being depressed by cam 11 of the set of cams S2 to the sinking point to then be raised by the cam 14 of this set of cams S2 until the butt F3 reaches the end of path V1—V2. All of this takes place during turning movement of the cam cylinder in one direction.

During the reverse turning movement of the cam cylinder, the first of the group of needles A, whose butt F2 would now follow along the path Y2—Y1, is engaged at point U1 by the control finger M2 to be directed downwardly along the path U1—U2, or to be engaged by the control finger M3 to be moved downwardly along the path p–1—p–2. Thus, during each reversal in the direction of turning movement of the cam cylinder, the first of the group of needles A is shifted downwardly to knit a different color with the group of needles B, so as to produce the desired pattern. This first needle of the group of needles A, which is shifted downwardly to the set of cams S2 by engagement with control fingers M2 or M3, is, after moving through the set of cams S2, moved upwardly to the correct height by an unillustrated cam. The remaining, following needles A are no longer affected by the fingers M2 or M3 so that these remaining needles move with their butts F1 from X2 to X1, along the path X2—X1. These remaining needles are guided downwardly to the set of stitching cams S1, move upwardly along cam 11 of this set of cams, through the parts 12 and 10 downwardly to the sinking point and are then guided back to the point X1 by an unillustrated cam.

This is the principle according to which the embodiment of Fig. 11 operates. When all of the needles of group A are shifted to knit with the set of stitching cams S2 together with the needles B, the control fingers M1—M3 are actuated to shift needles from group B back to group A.

Of course, other patterns may be provided by proper control of fingers such as fingers M1—M3 or by changing the colors within the areas w–1—w–6, b–7, or r–8. Also, within a particular area plating of any type may be provided.

Wherever in the specification and claims the term "knitting needle means" or the like is used, it is to be understood that the term includes needles and their associated jacks as in the first form of the invention, and also elongated needles with a plurality of butts on them as in the form of the invention of Fig. 11.

It will be understood that each of the elements described above, or two or more together, may also find a useful application in other types of circular knitting machines differing from the types described above.

While the invention has been illustrated and described as embodied in circular knitting machines for knitting argyle socks or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cam cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means; and four stitching cam means mounted in the inner face of said cylinder and being respectively located 90° apart from each other to cooperate with said butts of said needle means for reciprocating the latter to knit a multicolored fabric, said four stitching cam means all being located at the same elevation.

2. Apparatus for knitting multicolored fabrics comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; and four stitching cam means mounted in the inner face of said cylinder and being respectively located 90° apart from each other to cooperate with said butts of said needle means for reciprocating the latter to knit a multicolored fabric.

3. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; and four stitching cam means mounted in the inner face of said cylinder and being respectively located 90° apart from each other to cooperate with said butts of said needle means for reciprocating the latter to knit a multicolored fabric, said four stitching cam means all being located at the same elevation.

4. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; and four stitching cam means mounted in the inner face of said cylinder and being respectively located 90° apart from each other to cooperate with said butts of said needle means for reciprocating the latter to knit a multicolored fabric, said four stitching cam means all being located at the same elevation, said four stitching cam means including a pair of main stitching cam means and a pair of secondary stitching cam means which have the cams thereof located at a different elevation than the cams of said main stitching cam means.

5. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; four stitching cam means mounted in the inner face of said cylinder and being respectively located 90° apart from each other to cooperate with said butts of said needle means for reciprocating the latter to knit a multicolored fabric, said four stitching cam means all being located at the same elevation; and a plurality of additional cams mounted on the inner face of said cylinder beneath said four stitching cam means to cooperate with said additional butts for actuating said plurality of needle means.

6. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; four stitching cam means mounted in the inner face of said cylinder and being respectively located 90° apart from each other to cooperate with said butts of said needle means for reciprocating the latter to knit a multicolored fabric, said four stitching cam means all being located at the same elevation; and a pair of auxiliary cams located adjacent one of said stitching cam means for raising one of said groups of needles above the group of needles located directly opposite said one group of needles.

7. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, each of said needle means including an upper knitting portion having an upper butt, all of said upper butts being located at the same elevation and each of said needle means including a pair of jacks located in end to end relation with each other and with said upper portion of said needle means, each of said jacks having a butt, and the pair of butts of the plurality of needle means of one group being located at different elevations from the jack butts of the remaining groups, the butts of the lowermost jacks of one group being located at the same elevation as the butts of the lowermost jacks of a second group, and the butts of the uppermost jacks of said one group being located at the same elevation as the butts of the uppermost jacks of a third group; four stitching cam means mounted in the inner face of said cylinder and being respectively located 90° apart from each other to cooperate with said butts of said needle means for reciprocating the latter to knit a multicolored fabric, said four stitching cam means all being located at the same elevation; a first pair of auxiliary cams located adjacent one of said stitching cam means for raising one of said groups of needles above the group of needles located directly opposite said one group of needle means; and an additional cam mounted on said cylinder for raising the jacks of said one group of needle means together with the latter.

8. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means, all of said needle means having an upper butt located at the same elevation and said plurality of needle means each having a pair of additional butts located beneath said upper butt thereof, said additional butts of each group being located at different elevations each group having additional butts at one elevation, that is the elevation of additional butts of a second group, and having additional butts at another elevation, that is the elevation of additional butts of a third group; four stitching cam means mounted in the inner face of said cylinder and being respectively located 90° apart from each other to cooperate with said butts of said needle means for reciprocating the latter to knit a multicolored fabric, said four stitching cam means all being located at the same elevation, said four stitching cam means including a pair of main stitching cam means and a pair of secondary stitching cam means which have the cams thereof located at a different elevation than the cams of said main stitching cam means, one of the cams of one of said main stitching cam means being retractable from the inner face of said cylinder; and a pair of additional cams mounted on the inner face of said cylinder beneath the other of said main stitching cam means and being retractable so that the apparatus may knit an annular fabric portion of one color.

9. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means; four stitching cam means mounted in the inner face of said cylinder and being respectively located 90° apart from each other to cooperate with said butts of said needle means for reciprocating the latter to knit a multicolored fabric; a plurality of retractable control finger means for guiding the needle means of one group to the path along which the needle means of another group moves.

10. Apparatus for knitting multicolored fabrics, comprising, in combination, a cam cylinder adapted to be reciprocated about its axis; a plurality of knitting needle means arranged in side by side relation about the axis of said cylinder in the interior thereof and being substantially parallel to said axis, said plurality of needle means being mounted within said cylinder for reciprocating movement in a direction parallel to said cylinder axis so that said cylinder turns about said plurality of needle means, and each of said needle means including at least one butt, said plurality of needle means being made up of four successive groups of needle means each of which extends through 90° about the axis of said cylinder and each of which is different from the remaining groups of needle means; four stitching cam means mounted in the inner face of said cylinder and being respectively located 90° apart from each other to cooperate with said butts of said needle means for reciprocating the latter to knit a multicolored fabric; and a plurality of retractable cams mounted on said cylinder for moving the needles of one group into another group to produce a desired pattern.

11. In a circular independent needle, knitting machine a slotted needle cylinder with knitting needle means having operating butts resiprocably mounted in its slots, four yarn feeding stations around said cylinder, a plurality of cams adapted to engage the operating butts of of said knitting needle means, said cams comprising four separate cam paths each at a different level around said cylinder and adapted to cause said needle means to take yarn and knit at the different stations, means for transferring individual knitting needle means directly, without first bringing them to a common or inactive path, from operation in one of said cam paths to operation in another so that they take yarn and knit at a different station as desired, and means for causing reciprocating strokes of substantially 360° relative motion between said cylinder and said cams adapted to cause said cams to engage said butts and move said knitting needle means.

12. The invention according to claim 11 and wherein said means for transferring comprises a plurality of butt engaging picks.

13. In a circular, independent needle, knitting machine a slotted needle bearing cylinder with a plurality of knitting needle means having cam engaging butts reciprocably mounted in its slots, three or more separate cam systems proximate said cylinder, each comprising a separate cam path adapted to engage said butts and move said needle means through separate knitting cycles, means for moving individual ones of said knitting needle means directly from one cam path to another, means for causing reciprocating strokes of approximately 360° between said cylinder and said cams, and means for causing all of said cam systems to be operative on the butts of knitting needle means during single strokes.

14. Apparatus for knitting multicolored patterned fabrics, comprising in combination, knitting cam supporting means, a needle cylinder and needles slidable longitudinally in said needle cylinder, said needle cylinder and cam supporting means having relative rotation one with respect to the other whereby motion of the cams relatively to the needles causes them to pass through yarn taking and knitting waves, said needles having at least one butt and being divided into groups for forming different parts of a pattern in said fabrics being knitted, a jack for each of said needles, positioned beneath their needles and having butts at different levels in different groups, a plurality of stitching cam means spaced about said needle cylinder and groups of needles and disposed at a common level, cams for affecting said jacks for causing needles of a group to enter one set of stitching cams and to knit thereat and to pass another set of stitching cams without taking yarn and while holding their previously drawn loops, other cams for affecting jacks to cause needles of another group to enter a second set of stitching cams and to knit a yarn thereat different from that knitted at said cams first mentioned and to pass those cams without taking yarn and while holding their previously drawn loops, all in the same course of knitting and pick means including needle raising and lowering picks at one said stitching cam means and other needle displacing picks at another of the stitching can means, said picks being effective upon needles passing through that cam means with which they are associated for causing them to knit with needles of another group.

15. Apparatus for knitting multicolored pattern fabrics, comprising in combination, knitting cam supporting means, a needle cylinder and needles slidable longitudinally in said needle cylinder, said needle cylinder and cam supporting means having relative rotation one with respect to the other whereby motion of the cams relatively to the needles causes them to pass through yarn taking and knitting waves, said needles having at least one butt and being divided into groups for forming different parts of a pattern in said fabrics being knitted, a jack for each of said needles, positioned beneath their needles and having butts at different levels, a plurality of stitching cams spaced about said needle cylinder and groups of needles and disposed at a common level, cams for affecting said jacks for causing needles of a group individual to those jacks to enter one set of stitching cams and to knit thereat and to pass another set of stitching cams without taking yarn and while holding their previously drawn loops, other cams for affecting jacks to cause needles of another group and individual to those jacks to enter a second set of stitching cams and to knit a yarn thereat different from that knitted at said cams first mentioned and to pass those cams without taking yarn and while holding their previously drawn loops, all in the same course of knitting, and picks means including needle raising and lowering picks at one said stitching cam means and other needle displacing picks at another of the stitching cam means, said picks being effective upon needles passing through that cam means with which they are associated for causing them to knit with needles of another group thereby to vary the suture walewise between adjacent colored areas of the fabric.

16. Apparatus for knitting multicolored patterned fabrics, comprising in combination, a needle cylinder, independent needles reciprocable therein, said needles having butts and being divided into at least two groups, at least two sets of stitching cams for engaging butts of needles, a jack for each of the needles and cam means for said jacks positioned beneath their needles, said cams affecting said jacks and needles to cause one group thereof to pass through one set of stitching cams and to take yarn and knit and to cause another group to pass that stitching cam set without being affected by it, and to take yarn and knit at a second of said stitching cams which the first mentioned group of needles passes without taking yarn or knitting, means for effecting relative reciprocation between said cylinder, its needles and jacks, and said cams so that all needles pass all of said stitching cams at least once each stroke of knitting, and means for determining the extent to which said yarns shall be knitted in a course and for varying such extent walewise in accordance with predetermined pattern requirements which comprises needle raising and lowering picks at one said stitching cam means and other needle displacing picks at another of the stitching cam means, said picks being effective upon needles passing through that cam means with which they are associated for causing them to knit with needles of another group.

17. Mechanism as defined in claim 16 wherein said picks function upon jacks and without first bringing needles to a common pathway.

18. Apparatus for knitting multicolored patterned fabrics, comprising, in combination, knitting cam supporting means, a needle cylinder and needles slidable longitudinally in said needle cylinder, said needle cylinder and cam supporting means having relative rotation one with respect to the other, said needles having at least one butt and being divided into a plurality of groups, a jack for each of said needles, positioned beneath their needles and having butts at different levels in different groups, a plurality of stitching cam means spaced about said needle cylinder and groups of needles and disposed at a common level, jack cams disposed at a plurality of levels, certain of said jack cams functioning through jacks to cause needles individual to those jacks to knit at one set of said stitching cams and to pass through others without taking yarn or knitting, and pick means including needle raising and lowering picks at one said stitching cam means and other needle displacing picks at another of the stitching cam means, said picks being effective upon needles passing through that cam means with which they are associated for causing them to knit with needles of another group.

References Cited in the file of this patent

UNITED STATES PATENTS

| | | |
|---|---|---|
| 999,853 | Paquette | Aug. 8, 1911 |
| 1,084,194 | Blackburn et al. | Jan. 13, 1914 |
| 1,452,842 | Miller | Apr. 24, 1923 |
| 2,125,197 | Pass | July 26, 1938 |
| 2,158,189 | Lawson et al. | May 16, 1939 |
| 2,217,022 | Lawson et al. | Oct. 8, 1940 |
| 2,402,098 | St. Pierre | June 11, 1946 |
| 2,626,513 | Lombardi | Jan. 27, 1953 |
| 2,680,961 | Thurston | June 15, 1954 |

FOREIGN PATENTS

| | | |
|---|---|---|
| 308,421 | Great Britain | Mar. 28, 1929 |